(12) United States Patent
Guarnieri

(10) Patent No.: US 8,326,070 B2
(45) Date of Patent: Dec. 4, 2012

(54) SYSTEMS AND METHODS FOR ENHANCING IMAGE DIFFERENCES

(75) Inventor: Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 908 days.

(21) Appl. No.: 12/416,100

(22) Filed: Mar. 31, 2009

(65) Prior Publication Data

US 2010/0246948 A1 Sep. 30, 2010

(51) Int. Cl.
*G06K 9/00* (2006.01)
(52) U.S. Cl. ...................................... 382/254
(58) Field of Classification Search ................ 382/199, 382/254, 282, 283
See application file for complete search history.

(56) References Cited

U.S. PATENT DOCUMENTS

| | | | |
|---|---|---|---|
| 6,026,183 A * | 2/2000 | Talluri et al. | 382/194 |
| 6,061,476 A * | 5/2000 | Nichani | 382/270 |
| 6,961,468 B2 | 11/2005 | Huang et al. | |
| 7,076,101 B2 | 7/2006 | Chung et al. | |
| 7,092,571 B2 | 8/2006 | Hsieh | |
| 7,092,572 B2 | 8/2006 | Huang et al. | |
| 8,019,588 B1 * | 9/2011 | Wohlberg et al. | 703/22 |
| 2002/0099295 A1 * | 7/2002 | Gil et al. | 600/476 |
| 2004/0086156 A1 | 5/2004 | Furukawa et al. | |
| 2010/0246979 A1 | 9/2010 | Guarnieri | |

OTHER PUBLICATIONS

Office Action dated Mar. 6, 2012, in related application U.S. Appl. No. 12/416,119, filed Mar. 31, 2009, Kiyoshi Miyake.

* cited by examiner

*Primary Examiner* — John Strege
(74) *Attorney, Agent, or Firm* — Finnegan, Henderson, Farabow, Garrett & Dunner, L.L.P.

(57) ABSTRACT

Methods disclosed permit the enhancement of difference images associated with an image pair. In some embodiments, an enhanced difference image may be generated by selecting at least one non-zero target pixel in a thresholded difference image and performing operations on pixels that neighbor the target pixel in the thresholded difference image based on the value associated with the target pixel. In some embodiments, the operations on neighbors of the target pixel may be carried out using a user-specified paintbrush. The enhanced difference image may be rendered using a monitor or a printer.

26 Claims, 6 Drawing Sheets

SYSTEMS AND METHODS FOR ENHANCING IMAGE DIFFERENCES

CROSS REFERENCES TO RELATED APPLICATIONS

This application is related to the application entitled "SYSTEMS AND METHODS FOR OUTLINING IMAGE DIFFERENCES," Ser. No. 12/416,119 filed concurrently herewith. The above-mentioned application is hereby incorporated by reference into this application in its entirety for all purposes.

BACKGROUND

1. Field of the Invention

The present invention relates to the field of image and graphics processing and printing and in particular, to systems and methods for enhancing differences between high resolution images.

2. Description of Related Art

When digital high resolution images are used, the images are often compared to determine differences between the images. The comparing of images may arise in the context of both graphics and image processing applications. For example, in image processing, when multiple image processing algorithms are used to process the same input image, comparing the output images may be useful in determining differences in the output images produced by the various algorithms. As another example, when a printer is being tested with various rendering intent or color mapping algorithms it may be useful to compare the bit mapped output images produced by the algorithms against "gold standard" images, or the images produced by another printer as they exist in frame buffer memories of the respective printers.

One approach to comparing the images is to print the images on a high resolution printer or display the images on a high resolution monitor in order to identify differences by visually inspecting the images. However, such an approach, besides being time consuming, is unlikely to yield consistent results. Moreover, even the most detailed visual inspection will fail to catch minor differences between the images, or differences that may be masked because of the nature of the images.

Another approach is to calculate the difference in digital images by comparing corresponding pixels in the two images on a pixel-by-pixel basis and produce an output difference image based on the pixel differences between the images being compared. However, in such an approach, large numbers of inconsequential differences between pixel values may appear on the difference image making it difficult to focus on differences between the two images that a user may deem important. Therefore, there is a need for systems and methods to permit the enhancement of image differences between images in a flexible manner.

SUMMARY

Consistent with embodiments presented, a method for determining differences between images is presented. In some embodiments, a method for enhancing image differences in an input difference image comprises the steps of: selecting at least one target pixel in the difference image, wherein a value associated with the selected target pixel exceeds a threshold value; and generating an enhanced difference image by updating an existing value associated with at least one neighboring pixel in an area around the selected target pixel. In some embodiments, the value associated with the at least one neighboring pixel in the area around the selected target pixel is altered by: setting the value associated with the at least one neighboring pixel to the value associated with the selected target pixel, if the operation is opaque, and obtaining the value of the at least one neighboring pixel by performing a blending operation using the value associated with the target pixel and the existing value associated with the neighboring pixel, if the operation is non-opaque.

Embodiments also relate to software, firmware, and program instructions created, stored, accessed, or modified by processors using computer-readable media or computer-readable memory. The methods described may be performed on a computer and/or a printing device. These and other embodiments are further explained below with respect to the following figures.

DETAILED DESCRIPTION

In accordance with embodiments reflecting various features of the present invention, systems and methods for enhancing image differences between digital images are presented.

Figure 1:
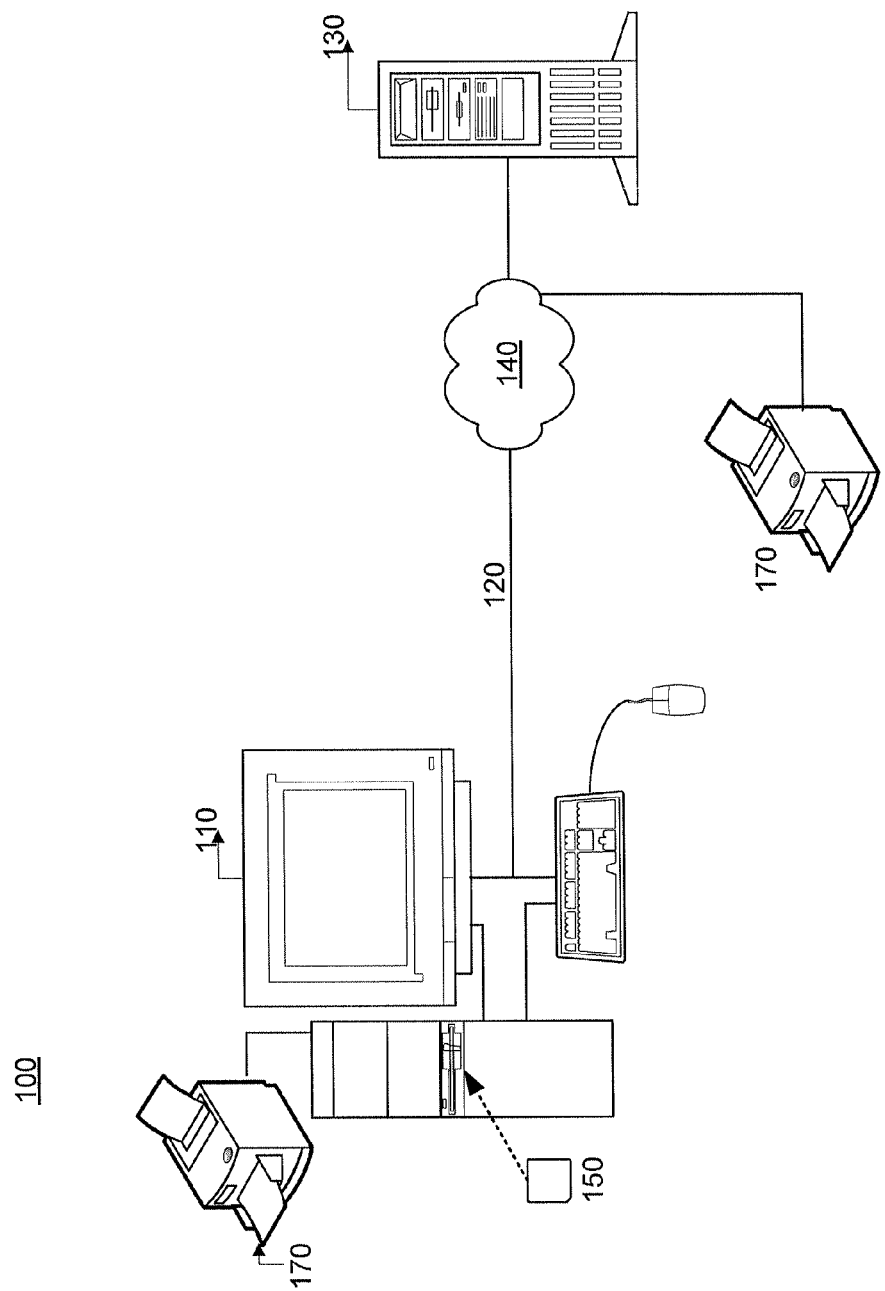
FIG. 1 shows a high level block diagram of a computer coupled to an exemplary printer 170, as shown in FIG. 1A.

FIG. 1 shows a block diagram illustrating an exemplary computer 110 coupled to exemplary printer 170 using connection 120, which may pass through network 140. In general, an application for enhancing image differences between digital images may be deployed on a network of computers and printing devices that may communicate over network 140. As shown in FIG. 1, exemplary system 100 includes computer 110, which may be a computer workstation, desktop computer, laptop computer, or any other appropriate computing device.

Connection 120 couples computing device 110 and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. Network 140 could include a Local Area Network (LAN), a Wide Area Network (WAN), or the Internet.

Printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 with (or without) additional processing by computing device 110.

Computing device 110 may contain a removable media drive, which may include, for example, 3.5 inch floppy drives, CD-ROM drives, DVD ROM drives, CD±RW or DVD±RW drives, USB™ flash drives, drives for Memory Sticks™, Secure Digital High Capacity ("SDHC") cards, and/or any other computer-readable removable media drives. Portions of applications may reside on removable media and be read by computing device 110 prior to being acted upon by system 100. Document processing and image processing software running on computing device 110 may allow users to view, edit, process, and store documents and images conveniently. Computer 110 may also execute applications compare, and enhance differences between digital images, and render the enhanced difference images on a monitor coupled to computer 100.

Figure 1A:
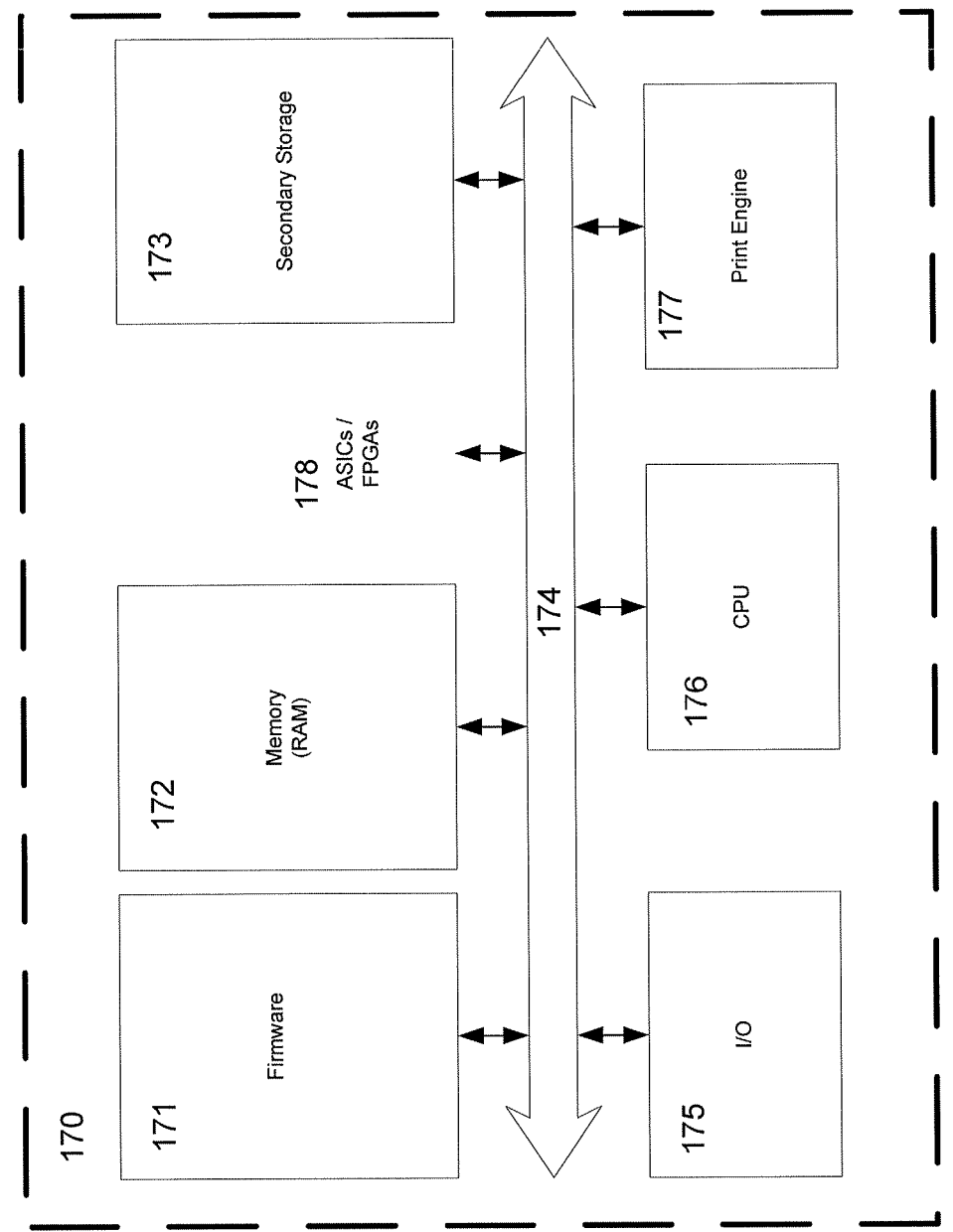

As shown in FIG. 1A, exemplary printer 170 may contain bus 174 that couples a Central Processing Unit ("CPU") 176, firmware 171, memory 172, input-output ports 175, print engine 177, and secondary storage device 173. Exemplary Printer 170 may also contain other processing elements, such as Application Specific Integrated Circuits (ASICs), Digital Signal Processors (DSPs), and/or Field Programmable Gate Arrays (FPGAs) 178 that are capable of executing portions of an application to compare and enhance differences between digital images and to print images and other documents. Printer 170 may also be capable of printing an output image that enhances differences between the images being compared in a manner consistent with disclosed embodiments.

Exemplary printer 170 may also be able to access secondary storage or other memory in computing device 110 using I/O ports 175, network 140, and connection 120. In some embodiments, printer 170 may also be capable of executing software including a printer operating system and other appropriate application software. Exemplary printer 170 may allow paper sizes, output trays, color selections, parameters for image differencing and enhancement algorithms, print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, document processing, routines to compare and enhance differences between digital images, and other code. In some embodiments, code and data in firmware 171 may be copied to memory 172 prior to being acted upon by CPU 176.

In some embodiments, firmware 171 may also include rasterization routines to convert display commands in a display list to an appropriate rasterized bit map image and store the bit mapped image in memory 172. Firmware 171 may also include routines for image compression, decompression, and memory management routines. Data and instructions in firmware 171 may be upgradeable using one or more of computer 110, network 140, and/or secondary storage 173.

Exemplary CPU 176 may act upon instructions and data and provide control and data to ASICs/FPGAs 178 and print engine 177 to generate printed output by rendering the enhanced difference images by processing differences between compared images in a manner consistent with disclosed embodiments. ASICs/FPGAs 178 may also provide control and data to print engine 177. FPGAs/ASICs 178 may also implement one or more of translation, compression, decompression, image comparison, image difference enhancement, and rasterization algorithms.

Exemplary secondary storage 173 may be an internal or external hard disk, Memory Stick™, SDHC card, or any other memory storage device or removable media device capable of being used by system 100. In some embodiments, the images being compared and/or the enhanced difference image may reside and be transferred between one or more of printer 170 and computing device 110 depending on where the document processing occurs. Memory to store the images being compared and/or the enhanced difference images may be a dedicated memory, and/or form part of general purpose memory 172, or some combination thereof. In some embodiments, digital images being compared and/or a digital difference image being enhanced may be stored on removable media coupled to computer 110, or on secondary storage 173 coupled to printer 170. Portions of the stored image(s) may be loaded into main memory on computer 110, and/or memory 172 in printer 170 during processing.

Figure 2A:
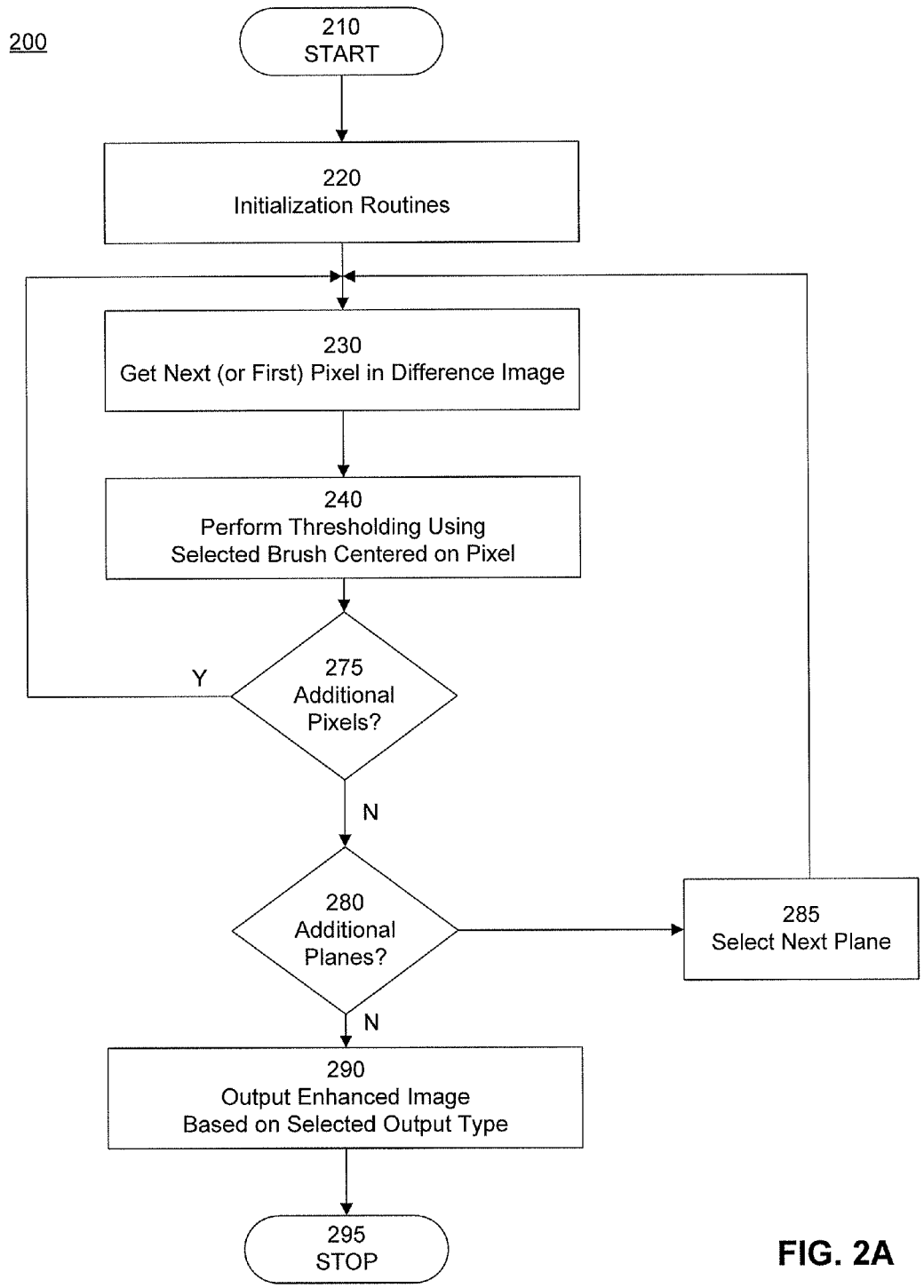
FIG. 2A shows a flowchart illustrating steps in an exemplary method 200 for enhancing image differences in a manner consistent with disclosed embodiments.

FIG. 2A shows a flowchart illustrating steps in an exemplary method 200 for enhancing image differences in a manner consistent with disclosed embodiments. The algorithm may commence in step 210, and initialization routines may be invoked in step 220. In some embodiments, initialization routines may include setting up and initializing variables, selecting and configuring a paintbrush, allocating memory, and various other program related operations.

If the input to exemplary method 200 is a pair of images, then initialization routines may generate a difference image using the image pair. Accordingly, initialization routine may involve one or more of resizing one or both of the images in the image pair so that their dimensions are identical, color space converting one the images to the color space of the other image, and/or rasterizing the images to bitmapped form. For example, an image in the CMYK color space CMYK color space comprising of Cyan ("C"), Magenta ("M"), Yellow ("Y"), and Black ("K") color components (or color planes) may be converted to an image in the RGB color space, which comprises of the Red, Green, and Blue color components. An image in a color space with a larger gamut of representable colors may be converted to a color space with a smaller gamut of representable colors, or vice versa. One of the images in the image pair may be scaled so that the image sizes are identical. For example, the image with smaller dimensions than a larger one may be scaled to match the size of the larger image.

Once the images have been represented in the same color space and have identical dimensions then a difference image may be generated by subtracting a value associated with a pixel in the first image from the value associated with a corresponding pixel in the second image. Initialization routines 220 may output a difference image when processing has completed.

A difference image can result from subtracting corresponding pixel values in two images with identical dimensions in the same color space and taking the absolute value or magnitude of the difference. In some embodiments, the difference image may consist of difference components corresponding to color components of the color space. Each difference component can the indicate differences between the images (in the image pair) for that color component. For example, a difference image in the CMYK color space may comprise four difference components, one difference component for each of the C, M, Y, and K planes.

In step, 230, the first or next target pixel in the current color component in difference image may be selected for processing. In some embodiments, pixels with a non-zero value in the difference image may be selected as target pixels for processing. For example, if corresponding pixels in the two images have the same value for a color component (pixel difference is zero), then that pixel may not be selected when processing pixels in the difference image for that color component.

Next, predefined routine 240 may be invoked and thresholding may be performed using a user-selected paintbrush that is centered on the target pixel. Exemplary pre-defined routine 240 is described further in relation to FIG. 2B later in this document. A paintbrush defines the granularity of operations carried out on the target pixel. Paintbrushes may be of various geometries (shapes and sizes) and may also have other characteristics, such as opacity.

Opacity determines if prior values of any pixels used in paint operations affect the value of the result. If a brush is opaque, any prior values of affected pixels are overwritten and the pixel will hold the value painted by the paintbrush at the end of the paint operation. If a brush is non-opaque the prior (existing) value of the pixel may be blended or composited with the value being painted by the paintbrush and the pixel will hold some algorithmic combination of the prior and painted values at the end of the paint operation. In general, blending operations can include a number of algorithmic combinations of two pixel values, including various types of mathematical operations.

The paintbrush determines the neighboring pixels in area around the target pixel that will be affected by any operations on the target pixel. For example, a square 3×3 pixel opaque paintbrush with the second pixel in the second row of the paintbrush as center, will paint all pixels in the 3×3 area defined when the paintbrush center pixel coincides with the target pixel. In other words, the paintbrush above will paint all pixels in the 3×3 area defined by centering the paintbrush on the target pixel. Because the operation is opaque any existing values of these pixels will be overwritten with the value of the target pixel. In the example above, pixels in the 3×3 area defined by centering the paintbrush on the target pixel are considered neighbors of the target pixel. In general, all pixels in some user-specified area around the target pixel may be considered as neighbors of the target pixel. In some embodiments, the area around the target pixel where all pixels may be considered as neighbors of the target pixel may be specified using a paintbrush.

In step 275, the algorithm checks if there are any additional pixels to be processed. If there are additional pixels ("Y" in step 275), then the algorithm returns to step 230 to begin another iteration and process the next pixel. If there are no more pixels to be processed in the current plane ("N" in step 275) then, in step 245, the algorithm checks whether there are additional color planes or color components to be processed. If there are additional color planes in the difference image to be processed ("Y" in step 245) then, the next plane is selected in step 285, and the algorithm returns to step 230 to begin another iteration and process the first pixel in the newly selected color plane.

If there are no more color planes to be processed ("N" in step 280) then, in step 290, the enhanced difference image may be output. In some embodiments, one component enhanced difference image may be output for each color component in the difference image. In some embodiments, the enhanced difference image may be output in black and white (i.e. single plane image with 2 states per pixel), or as a gray scale (single plane image with multiple states per pixel) or as a composite color (multi-plane image with multiple states per pixel). The algorithm may then terminate in step 295. Algorithms to convert color images to black and white or gray scale images are well-known and may be utilized to generate the appropriate output.

Figure 2B:
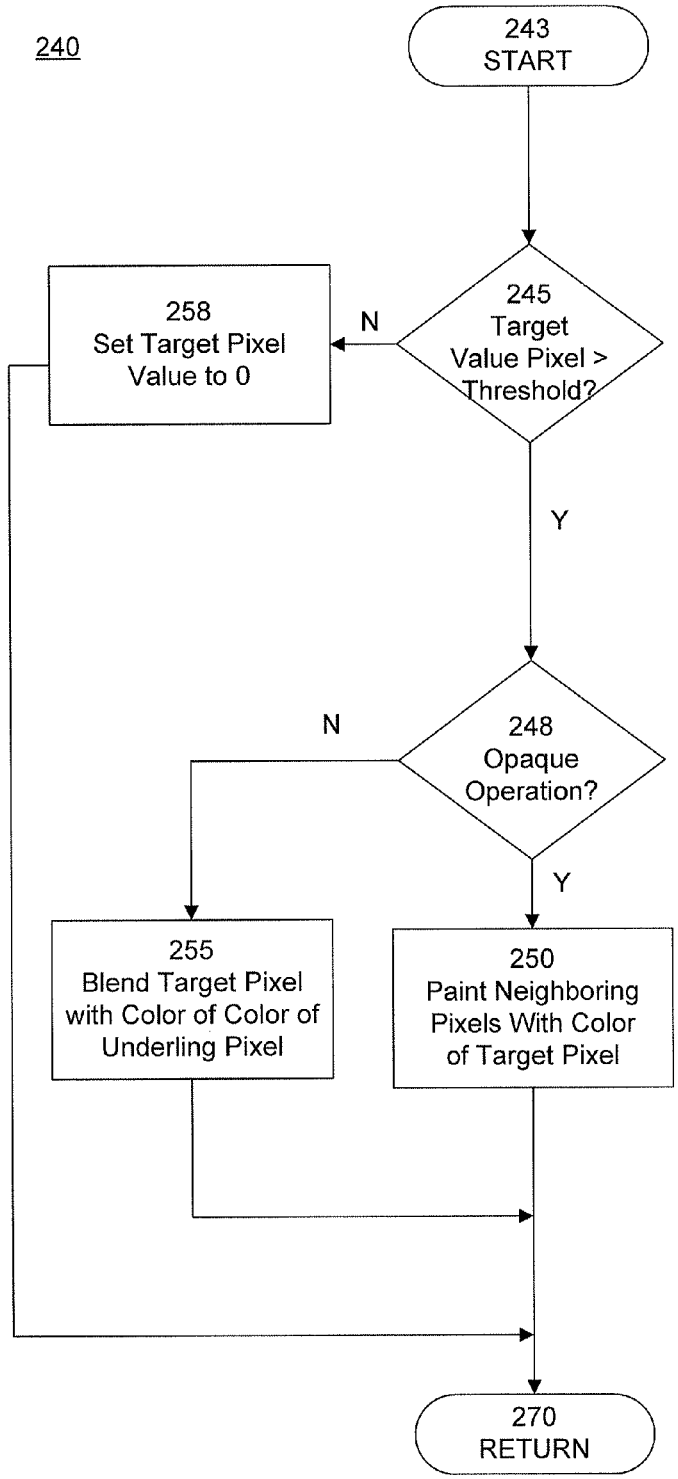
FIG. 2B shows exemplary operations carried out by predefined routine 240 to enhance image differences using thresholding and a user-selected paintbrush that is centered on the target pixel.

FIG. 2B shows exemplary operations carried out by pre-defined routine 240 to enhance image differences using thresholding and a user-selected paintbrush that is centered on the target pixel. In some embodiments, the algorithm may operate on all neighboring pixels in an area around the target pixel, where the area around the target pixel is bounded by the paintbrush when the paintbrush is centered on the target pixel. In some embodiments, the center of the paintbrush may be specified as a property of the paintbrush. Paintbrushes may be of various shapes such as polygons, circles etc., and may take on various sizes. The algorithm implemented by exemplary predefined routine 240 commences in step 243. In step 245, the algorithm checks whether the value associated with the target pixel is greater than some user-specified threshold. Note that the target pixel is a pixel with a non-zero value in the difference image for a color component.

If the value associated with the target pixel (or target pixel value) is not greater than the threshold ("N" in step 245), then the algorithm proceeds to step 258, where the target pixel value may be set to zero, before proceeding to step 270. If the target pixel value is greater than the threshold ("Y" in step 245), then, in step 248, the algorithm checks whether the current paint operation is an opaque operation.

If the paint operation is opaque ("Y" in step 248), then, in step 250, all neighboring pixels in the area bounded by the paintbrush when the paintbrush is centered on the target pixel are painted with the value (color) associated with the target pixel. In other words, the value of all neighboring pixels are updated and set equal to the value of the target pixel.

If the paint operation is non-opaque ("N" in step 248), then, in step 255, all neighboring pixels in the area bounded by the paintbrush when the paintbrush is centered on the target pixel are blended or composited with target pixel. In other words, the value (color) associated with a neighboring pixel is updated by performing some specified algorithmic combination using the target pixel value and the existing value associated the neighboring pixel. In step 270, exemplary pre-defined routine returns control to the calling program.

Method 200 may be implemented by program code running on computer 110 and/or printer 170. In some embodiments, the programs may be stored on removable media and be executed by processors on computer 110 or printer 170. In some embodiments, some or all of the code may be implemented in firmware 171, and/or using FPGAs, ASICs, or DSPs 178.

Figure 3A:
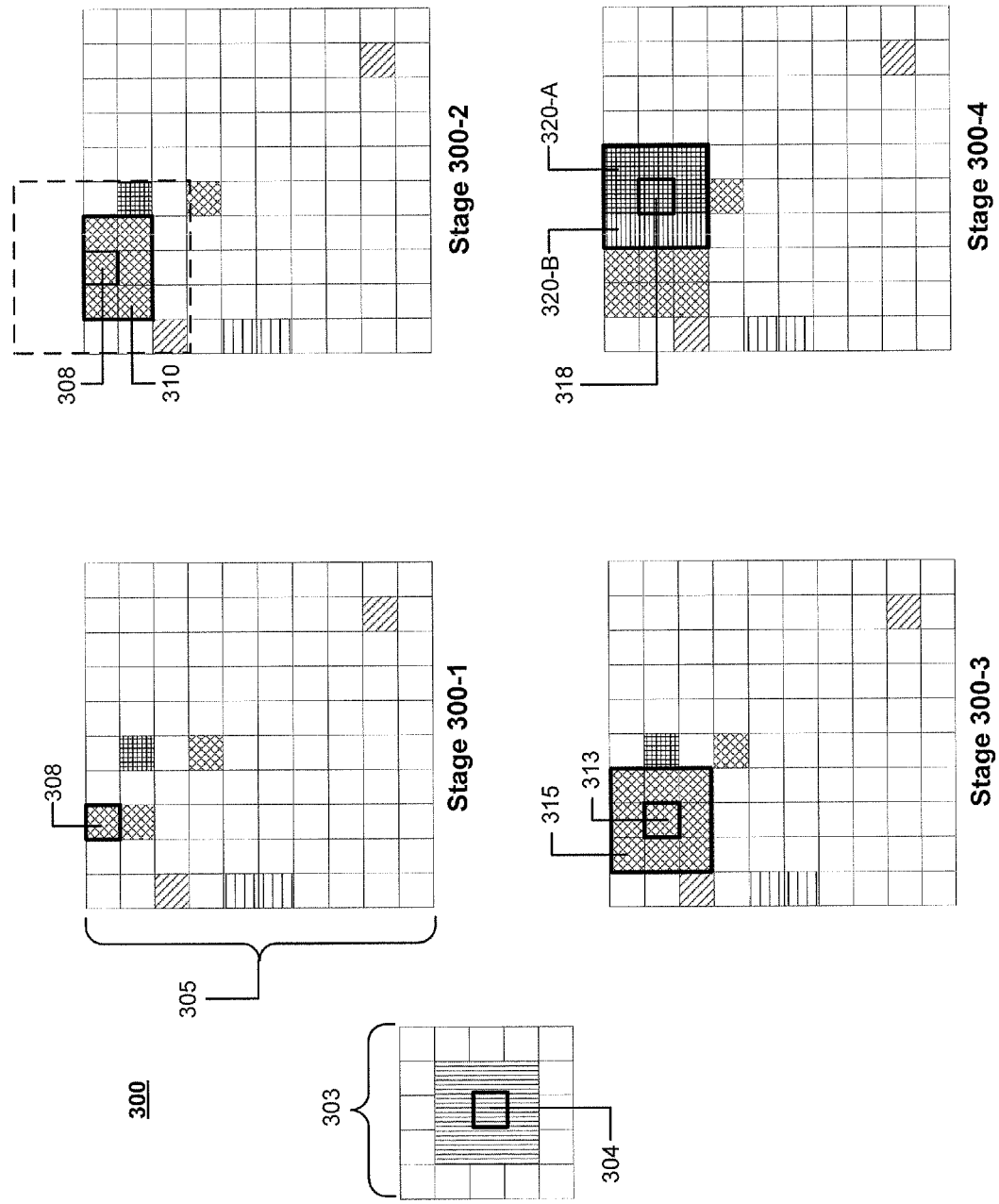
FIGS. 3A and 3B show stages in the transformation of an exemplary difference image in to an enhanced difference image in a manner consistent with disclosed embodiments.
Figure 3B:
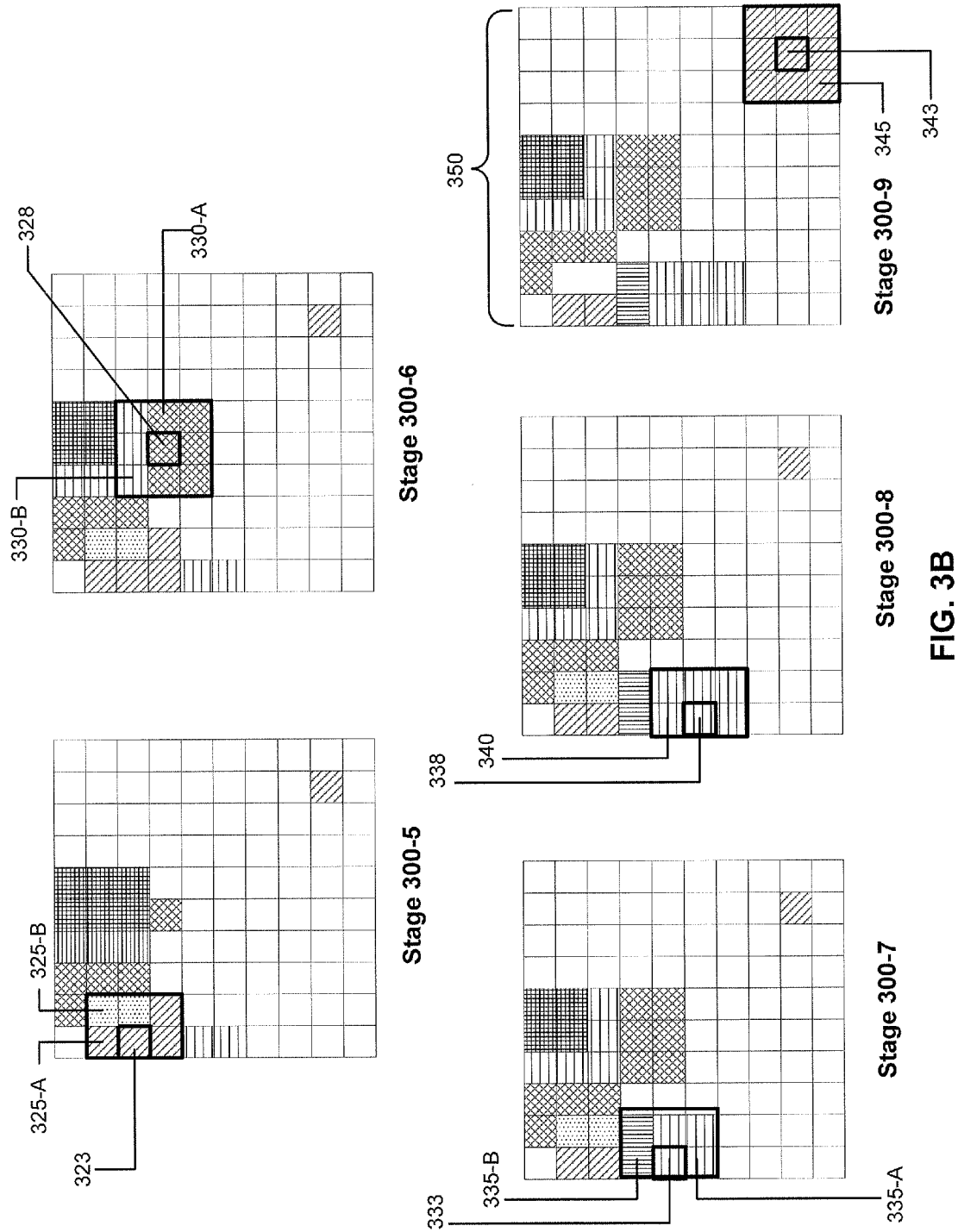

FIGS. 3A and 3B show stages in the transformation of an exemplary difference image into an enhanced difference image in a manner consistent with disclosed embodiments. In some embodiments, the transformation may be accomplished by method 200. As shown in FIG. 3A, paintbrush 303 is a non-opaque, square-shaped, and bounds an area of 3×3 pixels, with center pixel 304. In some embodiments, paintbrush 303 may be used by pre-defined routine 240 to perform difference image enhancement operations. As shown in FIG. 3A, exemplary input difference image 305 comprises a 10×10 pixel area. In some embodiments, input difference image 305 may serve as input to method 200, or may be output by initialization routine 210.

As shown in FIG. 3A, input difference image 305 includes several pixels with non-zero values that are shown by shaded cells. The distinct shading patterns in the cells correspond to distinct values associated with the pixels. Pixels that have a zero value in input difference image 305 are unmarked (unshaded). In some embodiments, input difference image 305 may comprise one component of a difference image input to method 200. As shown in FIG. 3A, in stage 300-1, pixel 308 is the (first) target pixel selected for processing as indicated by a dark border around the pixel.

In the examples shown, it is assumed that the blending of a pixel value with itself does not result in a change to the pixel value. Therefore, if a pixel has been painted with a value then blending the pixel with the same value again will not change the value of the pixel. Accordingly, in depicting the stages in FIGS. 3A and 3B, such operations may not be explicitly identified.

In stage 300-2, non-opaque paintbrush 303 is applied to input difference image 305 centered on target pixel 308. Paintbrush area 310, which represents the pixel area impacted by paintbrush 303, is shown by the dark bordered 3×2 pixel area. Note that because some portion of paintbrush 303 lies outside input difference image 305 when paintbrush 303 is centered on target pixel 308, paintbrush area 310 is of smaller size than paintbrush 303. Paintbrush 303 is centered on target pixel 308 when center pixel 304 coincides with target pixel 308. As a consequence of the paint operation using paintbrush 303 centered on pixel 308, neighboring pixels in paintbrush area 310 acquire the pixel value of pixel 308. The values of pixels outside paintbrush area 310 (non-neighboring pixels) are not affected.

In stage 300-3, non-opaque paintbrush 303 is applied to the image from stage 303-2 centered on the next target pixel 313. Paintbrush area 315 is shown by the dark bordered 3×3 pixel area. As a consequence of the paint operation using paintbrush 303 centered on target pixel 313, neighboring pixels in paintbrush area 315 acquire the pixel value of pixel 313 as indicated by the common shading pattern for the entire 3×3 paintbrush area 315.

In stage 300-4, non-opaque paintbrush 303 is applied to the image from stage 303-3 centered on the next target pixel 318. Paintbrush area 320 is shown by the dark bordered 3×3 pixel area and comprises of two sub-areas 320-A and 320-B. As a consequence of the paint operation using paintbrush 303 centered on target pixel 318, neighboring pixels in paintbrush area 320-A, which were unmarked (zero) prior to stage 300-4 acquire the pixel value of pixel 313, whereas neighboring pixels in paintbrush area 320-B, which were marked during paint operations in stage 300-3, acquire a different value obtained by blending their prior value (the value associated with pixel 313) with the value of pixel 318.

Moving now to FIG. 3B, in stage 300-5, non-opaque paintbrush 303 is applied to the image from stage 303-4 centered on the next target pixel 323. Paintbrush area 325 is shown by the dark bordered 3×2 pixel area and comprises of two sub-areas 325-A and 325-B. As a consequence of the paint operation using paintbrush 303 centered on target pixel 323, neighboring pixels in paintbrush area 325-A, which were unmarked (zero) prior to stage 300-5 acquire the pixel value of pixel 323, whereas neighboring pixels in paintbrush area 315-B, which were marked during paint operations in stage 300-3, acquire a different value obtained by blending their prior value (the value associated with pixel 313) with the value of pixel 323.

In stage 300-6, non-opaque paintbrush 303 is applied to the image from stage 300-5 centered on the next target pixel 328. Paintbrush area 330 is shown by the dark bordered 3×3 pixel area and comprises two sub-areas 330-A and 330-B. As a consequence of the paint operation using paintbrush 303 centered on target pixel 328, neighboring pixels in paintbrush area 330-A, which were unmarked (zero) prior to stage 300-6 acquire the pixel value of pixel 328, whereas neighboring pixels in paintbrush area 330-B, which were marked during paint operations in stages 300-3 and 300-4, acquire a different value obtained by blending their existing values with the value of pixel 328.

Stage 300-7 shows the result of applying non-opaque paintbrush 303 to the image from stage 303-6 centered on the next target pixel 333. Pixel values in the paintbrush area 335, which comprises two sub-areas 335-A and 335-B, are altered based on the paint operations. Neighboring pixels in area 335-A, which were unmarked take on the value of target pixel 333. Neighboring pixels in area 335-B take on new values obtained by blending their existing values with the value of target pixel 333.

Stage 300-8 shows the result of applying non-opaque paintbrush 303 to the image from stage 303-8 centered on the next target pixel 338. Neighboring pixel values in the paintbrush area 340 are altered based on the paint operations based on the value of target pixel 338 and their existing values as explained above.

Finally, stage 300-9, shows the result of applying non-opaque paintbrush 303 to the image from stage 303-8 centered on the next target pixel 343 resulting in the values of neighboring pixels in paintbrush area 345 being changed to the value of target pixel 343 and yielding enhanced difference image 350.

In some embodiments, the exemplary operations shown in FIGS. 3A and 3B may be performed on input difference image 305 in the frame buffer of printer 170 of FIG. 1 and the output enhanced print image(s) 350 may be printed by printer 170. In some embodiments, images to be compared may be sent by printer 170 to computer 110, which may generate input difference image 305 and operate on input difference image 305 to produce an enhanced difference image and display the enhanced difference on a monitor or other display device coupled to computer 110. In some embodiments, the algorithm may be modified to operate on a thresholded difference image i.e. a difference image to which thresholding has already been applied using some user or system specified threshold value.

In the situation where paintbrush 303 is opaque, pixel values of the target pixel at any stage will overwrite any prior pixel values of neighboring pixels in the paintbrush area. No blending operations are carried out.

By specifying a threshold value and a paintbrush, the user may be able to ignore pixel value differences between two images that are deemed insignificant to an application on one hand, while, on the other hand, pixel differences deemed material to an application may be exaggerated by propagating the differences to neighboring pixels over an area and a shape defined by the selected paintbrush.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor-implemented method for enhancing image differences in an input difference image comprising the steps of:

selecting at least one target pixel in the difference image, wherein a value associated with the selected target pixel exceeds a threshold value;

setting a paintbrush operation as opaque or non-opaque; and generating an enhanced difference image by updating an existing value associated with at least one neighboring pixel in an area around the target pixel by:

setting the value associated with the at least one neighboring pixel to the value associated with the selected target pixel, if the paintbrush operation is opaque, and obtaining the value of the at least one neighboring pixel by performing a blending operation using the value associated with the selected target pixel and the existing value associated with the neighboring pixel, if the paintbrush operation is non-opaque.

2. The processor-implemented method of claim 1, wherein the input difference image is obtained by subtracting a value associated with a pixel in a first image from a value associated with a corresponding pixel in a second image, wherein the first and second images are of identical dimensions and specified in a common color space.

3. The processor-implemented method of claim 1, wherein the input difference image is specified in a color space comprising a plurality of color components.

4. The processor-implemented method of claim 3, wherein the input difference image comprises a plurality of component difference images, wherein each component difference image is associated with a distinct color component of the color space.

5. The processor-implemented method of claim 3, wherein the enhanced difference image is specified in the same color space as the input difference image.

6. The processor-implemented method of claim 5, wherein the enhanced difference image comprises a plurality of component enhanced difference images, wherein each component enhanced difference image is associated with a distinct color component of the color space.

7. The processor-implemented method of claim 6, further comprising rendering the enhanced difference image by rendering each component enhanced difference image separately.

8. The processor-implemented method of claim 1, further comprising rendering the enhanced difference image as a composite color image.

9. The processor-implemented method of claim 1, further comprising rendering the enhanced difference image as a black and white image.

10. The processor-implemented method of claim 1, further comprising rendering the enhanced difference image as a gray scale image.

11. The processor-implemented method of claim 1, wherein the method is performed on at least one of:
   a computer; or
   a printer.

12. The processor-implemented method of claim 1, wherein the at least one neighboring pixel in the area around the target pixel is specified using a paintbrush.

13. A computer-readable medium that stores instructions, which when executed by a processor perform steps in a method for enhancing image differences in an input difference image, the steps comprising:
   selecting at least one target pixel in the difference image, wherein a value associated with the selected target pixel exceeds a threshold value;
   setting a paintbrush operation as opaque or non-opaque; and
   generating an enhanced difference image by updating an existing value associated with at least one neighboring pixel in an area around the target pixel by:
      setting the value associated with the at least one neighboring pixel to the value associated with the selected target pixel, if the paintbrush operation is opaque, and
      obtaining the value of the at least one neighboring pixel by performing a blending operation using the value associated with the selected target pixel and the existing value associated with the neighboring pixel, if the paintbrush operation is non-opaque.

14. The computer-readable medium of claim 13, wherein the input difference image is specified in a color space comprising a plurality of color components.

15. The computer-readable medium of claim 14, wherein the input difference image comprises a plurality of component difference images, wherein each component difference image is associated with a distinct color component of the color space.

16. The computer-readable medium of claim 15, wherein the enhanced difference image is specified in the same color space as the input difference image.

17. The computer-readable medium of claim 16, wherein the enhanced difference image comprises a plurality of component enhanced difference images, wherein each component enhanced difference image is associated with a distinct color component of the color space.

18. The computer-readable medium of claim 17, further comprising rendering the enhanced difference image by rendering each component enhanced difference image separately.

19. The computer-readable medium of claim 13, further comprising rendering the enhanced difference image as a composite color image.

20. The computer-readable medium of claim 13, further comprising rendering the enhanced difference image as a black and white image.

21. The computer-readable medium of claim 13, further comprising rendering the enhanced difference image as a gray scale image.

22. A computer readable memory containing instructions for controlling a processor to perform steps in a method for enhancing image differences in an input difference image, the steps comprising:
   selecting at least one target pixel in the difference image, wherein a value associated with the selected target pixel exceeds a threshold value;
   setting a paintbrush operation as opaque or non-opaque; and
   generating an enhanced difference image by updating an existing value associated with at least one neighboring pixel in an area around the target pixel by:
      setting the value associated with the at least one neighboring pixel to the value associated with the selected target pixel, if the paintbrush operation is opaque, and
      obtaining the value of the at least one neighboring pixel by performing a blending operation using the value associated with the selected target pixel and the existing value associated with the neighboring pixel, if the paintbrush operation is non-opaque.

23. The computer-readable memory of claim 22, further comprising rendering the enhanced difference image.

24. The computer-readable memory of claim 23, wherein the enhanced difference image is rendered as a black and white image.

25. The computer-readable memory of claim 23, wherein the enhanced difference image is rendered as a gray scale image.

26. The computer-readable memory of claim 23, wherein the enhanced difference image is rendered as a composite color image.

* * * * *